US012124830B2

(12) United States Patent
Schnieders et al.

(10) Patent No.: US 12,124,830 B2
(45) Date of Patent: Oct. 22, 2024

(54) METHOD AND SYSTEM FOR CONFIGURING A MOBILE POINT-OF-SALES APPLICATION

(71) Applicant: Deutsche Telekom AG, Bonn (DE)

(72) Inventors: Dominik Schnieders, Aachen (DE); Stephan Spitz, Karlsfeld (DE); Hermann Geupel, Munich (DE)

(73) Assignee: DEUTSCHE TELEKOM AG, Bonn (DE)

(*) Notice: Subject to any disclaimer, the term of this patent is extended or adjusted under 35 U.S.C. 154(b) by 190 days.

(21) Appl. No.: 17/868,789

(22) Filed: Jul. 20, 2022

(65) Prior Publication Data
US 2023/0026526 A1    Jan. 26, 2023

(30) Foreign Application Priority Data
Jul. 22, 2021   (EP) ..................... 21187290

(51) Int. Cl.
G06F 8/61    (2018.01)
G06Q 20/20   (2012.01)
G06Q 20/32   (2012.01)

(52) U.S. Cl.
CPC ............. G06F 8/61 (2013.01); G06Q 20/202 (2013.01); G06Q 20/326 (2020.05)

(58) Field of Classification Search
CPC ....... G06F 8/61; G06Q 20/326; G06Q 20/202
See application file for complete search history.

(56) References Cited

U.S. PATENT DOCUMENTS

| 9,898,739 | B2* | 2/2018 | Monastyrsky | G06F 21/10 |
| 9,904,800 | B2* | 2/2018 | Spodak | G06K 19/06206 |
| 9,978,049 | B2* | 5/2018 | Dunstan | G07F 17/329 |
| 10,503,870 | B2* | 12/2019 | Colabella | G06Q 20/3823 |
| 10,510,055 | B2* | 12/2019 | Desai | G06Q 20/3223 |
| 10,713,904 | B2* | 7/2020 | Beatty | G07G 1/0009 |

(Continued)

FOREIGN PATENT DOCUMENTS

EP    2820601 B1   10/2021

OTHER PUBLICATIONS

Wikipedia Editors: "Edge computing—Wikipedia", Online Encyclopedia Wikipedia, Jul. 13, 2021 (Jul. 13, 2021), XP055871266, Retrieved from the Internet: URL: https://en.wikipedia.org/w/index.php?title=Edge_computing&oldid=I033325022 [retrieved on Dec. 9, 2021], the whole document.

*Primary Examiner* — Douglas M Slachta
(74) *Attorney, Agent, or Firm* — LEYDIG, VOIT & MAYER, LTD.

(57) ABSTRACT

A method for configuring a mobile Point-of-Sales (mPOS) application for executing a transaction includes: installing an application frontend of the mPOS application on a terminal device connected to a communication network; installing an application backend of the mPOS application on an edge cloud server of the communication network; configuring the application frontend to act, upon launch, as an I/O interface and to communicate with the application backend via a secure connection provided by the communication network; and splitting I/O drivers comprised by computer program code of the mPOS application into a low-level driver executed on the terminal device as part of the I/O interface and a high-level driver executed in the application backend at the edge cloud server.

10 Claims, 1 Drawing Sheet

(56) References Cited

U.S. PATENT DOCUMENTS

| | | | | |
|---|---|---|---|---|
| 2006/0247824 | A1* | 11/2006 | Walker | G06Q 30/02 |
| | | | | 700/241 |
| 2008/0283591 | A1* | 11/2008 | Oder, II | G06Q 20/40 |
| | | | | 235/380 |
| 2012/0150669 | A1* | 6/2012 | Langley | G06Q 20/356 |
| | | | | 705/16 |
| 2012/0317628 | A1* | 12/2012 | Yeager | G06Q 20/3278 |
| | | | | 726/5 |
| 2013/0229352 | A1* | 9/2013 | Tsutsumi | G06F 3/041 |
| | | | | 235/375 |
| 2014/0046786 | A1* | 2/2014 | Mazaheri | G06Q 20/4016 |
| | | | | 705/18 |
| 2015/0199667 | A1* | 7/2015 | Fernando | G06Q 20/202 |
| | | | | 705/21 |
| 2015/0287031 | A1* | 10/2015 | Radu | G06Q 20/204 |
| | | | | 705/18 |
| 2015/0348031 | A1* | 12/2015 | Sh. Al-Rashidi | G06Q 20/36 |
| | | | | 705/64 |
| 2016/0005020 | A1* | 1/2016 | Fernando | G06Q 20/202 |
| | | | | 705/21 |
| 2016/0380849 | A1* | 12/2016 | Kawamori | G06Q 20/202 |
| | | | | 709/224 |
| 2017/0011391 | A1* | 1/2017 | Koh | G06Q 20/326 |
| 2017/0278097 | A1* | 9/2017 | Haggerty | G06Q 20/3552 |
| 2017/0308882 | A1* | 10/2017 | Bedier | G06Q 20/108 |
| 2018/0018663 | A1* | 1/2018 | Van | G07F 7/0873 |
| 2018/0315038 | A1* | 11/2018 | Rezayee | H04W 76/10 |
| 2019/0392277 | A1* | 12/2019 | Agrawal | G06Q 20/405 |
| 2020/0210995 | A1* | 7/2020 | Cho | G06Q 20/326 |
| 2023/0022658 | A1* | 1/2023 | Schnieders | G06Q 20/202 |

* cited by examiner

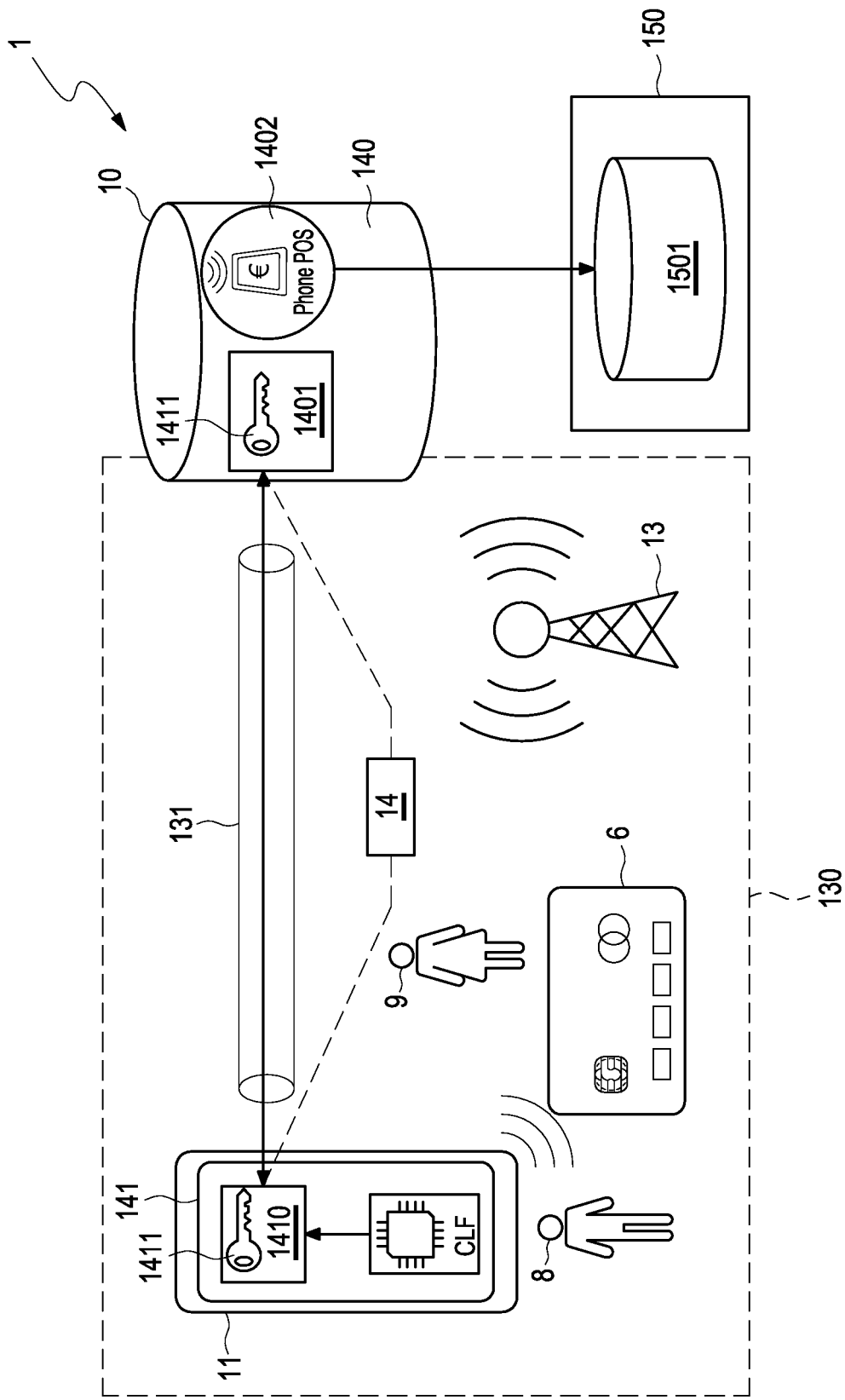

METHOD AND SYSTEM FOR CONFIGURING A MOBILE POINT-OF-SALES APPLICATION

CROSS-REFERENCE TO PRIOR APPLICATIONS

This application claims benefit to European Patent Application No. EP 21 187 290.8, filed on Jul. 22, 2021, which is hereby incorporated by reference herein.

FIELD

The invention relates to a method for configuring a mobile Point-of-Sales (mPOS) application in a communication network. Furthermore, the invention relates to a system for operating a mPOS application in a communication network.

BACKGROUND

A mPOS application is used for completing a purchase, particularly a transaction (e.g. a payment), and is usually executed on a COTS (Common of the Shelf) device.

The mPOS application (i.e. the COTS device) is assigned to and configured for a particular user (e.g. a merchant). For operating a mPOS application, particularly for completing a transaction, the user provides the COTS device with transaction data. The transaction data may be automatically provided by the mobile point-of-sale (POS) application implemented on the COTS device or manually provided by the user operating a human machine interface of the COTS device (e.g. by hitting a keypad of the COTS device or by touching a keypad displayed by a touch screen of the COTS device). The transaction data to be provided at least comprises a transaction amount (e.g. an amount of money corresponding to a price of a product to be sold).

During a normal operation of the mPOS application, the mPOS application is executed by the COTS device that is connected via a connection to a communication network. When the mPOS application is provided with the transaction data, a further user (e.g. a customer) is required to check the provided transaction data, to provide further transaction data (e.g. data indicating an account to be debited) and to authorize the transaction. The further user may provide a transaction device comprising the further transaction data (e.g. a payment card or a further terminal device) for being read by the COTS device, and additionally provide a personal key (e.g. a personal identification number (PIN)) by operating the human machine interface of the COTS device (e.g. by hitting a keypad of the COTS device or by touching a keypad displayed by a touch screen of the COTS device). When the provided personal key matches the transaction device the mPOS application considers the transaction to be authorized and completes the transaction by transmitting a transaction request indicating the transaction and comprising the transaction data, the further transaction data and a corresponding transaction authorization via the connection to a remote network server, particularly to a payment system as part of a payment infrastructure that is installed on the remote network server.

As described above, the further user has to have his transaction device read by the COTS device and to operate the COTS device for authorizing the transaction. The further user may suffer from a certain discomfort or anxiety in presenting sensitive account data. Such a mPOS application is exposed to many attacks. An attack surface of a standard Android/iOS device is quite high. For this reason, mPOS solutions on a COTS device are combined with an extensive external monitoring system, which guarantees the health of the device. However, this monitoring is complex and has a performance impact, too. Moreover, a mPOS application on a COTS device requires a complex setup and personalization procedure in which a respective merchant and the COTS device have to be verified remotely. These shortcomings may reduce a wide acceptance of such methods and systems for completing a transaction, i.e. for operating a mPOS application.

SUMMARY

In an exemplary embodiment, the present invention provides a method for configuring a mobile Point-of-Sales (mPOS) application for executing a transaction. The mPOS application is implemented as a computer program code. The method includes: installing an application frontend of the mPOS application on a terminal device connected to a communication network; installing an application backend of the mPOS application on an edge cloud server of the communication network; configuring the application frontend to act, upon launch, as an I/O interface and to communicate with the application backend via a secure connection provided by the communication network; and splitting I/O drivers comprised by the computer program code of the mPOS application into a low-level driver executed on the terminal device as part of the I/O interface and a high-level driver executed in the application backend at the edge cloud server.

BRIEF DESCRIPTION OF THE DRAWINGS

Subject matter of the present disclosure will be described in even greater detail below based on the exemplary FIGURES. All features described and/or illustrated herein can be used alone or combined in different combinations. The features and advantages of various embodiments will become apparent by reading the following detailed description with reference to the attached drawings, which illustrate the following:

FIG. 1 schematically shows a diagram of a system according to the invention.

DETAILED DESCRIPTION

Exemplary embodiments of the invention provide a method for configuring and implementing a mobile Point-of-Sales (mPOS) application which provides a safe protection of both sensitive data and health of the merchant's device. Exemplary embodiments of the invention further provide a system for operating a mobile Point-of-Sales, mPOS, application.

A first aspect of the invention is a method for configuring and implementing a mobile Point-of-Sales (mPOS) application with a mPOS functionality implemented as a computer program code, the mPOS functionality comprising executing a transaction, the method comprising the steps:

installing an application frontend of the mPOS application on a terminal device connected to a communication network, installing an application backend of the mPOS application on a edge cloud server of the communication network, configuring the application frontend to act, upon launch, as an I/O interface and to communicate with the application backend via a secure connection provided by the communication network, and splitting I/O drivers comprised by the computer program code of the mPOS application into a low-level driver executed on the terminal device as part of the I/O interface and a high-level driver executed in the application backend at the edge cloud server.

The terminal device itself acts as a hardware I/O (input/output) device used by a human (or another system) to communicate with the edge cloud server. The application frontend installed on the terminal device acts, upon launch of the mPOS application, as I/O interface.

According to the invention, the mPOS application is a distributed application with an application backend and an application frontend which are executed on different devices arranged remote from each other, i.e. the edge cloud server and the terminal device, respectively. Both the application backend and the application frontend may be implemented as a software program product.

According to the invention, the integrity of the mPOS application is ensured by designing, configuring and implementing the mPOS application as a distributed application and by installing the application backend in an edge cloud server, so that, upon launch, sensitive parts of the mPOS application are operated in a secure environment. The edge cloud server provides the desired secure environment. Both the application backend and the application frontend may be implemented as a respective part of the computer program code implementing the mPOS application functionality. That means that the computer program code describing the mPOS application functionality is divided into a first part realized as application frontend and installed on the terminal device and a second part realized as application backend and installed on the edge cloud server, i.e. the computer program code of the mPOS application is distributed among the terminal device and the edge cloud server.

The terminal device may be a dedicated terminal device or a general terminal device (e.g. a smartphone or the like), which is operated by a user (e.g. a merchant). The application backend and the application frontend communicate with each other via the secure connection provided by the communication network.

According to the invention the application frontend acts, upon launch, as an I/O interface and communicates with the application backend via the secure connection provided by the communication network and the application backend executes, upon launch, the second part of the computer program code of the mPOS application, the second part realizing all steps of the mPOS application that are sensitive and worthy of protection.

In many embodiments, configuring the application frontend as I/O interface comprises configuring the application frontend to capture transaction data associated with the transaction to be started from a user via a human machine interface of the terminal device and to receive further transaction data from a transaction device via the low-level driver and to transmit the transaction data and the further transaction data via the secure connection to the application backend. The transaction data may be integrated into a transaction request indicating the transaction. The transaction request is transmitted, for starting the transaction, from the application frontend to the application backend via the secure connection. The further transaction data may be integrated into a transaction authorization. The transaction authorization is transmitted from the application frontend, upon receipt of an authorization request from the application backend, to the application backend via the secure connection.

The application backend, upon receipt of the transaction authorization, completes the transaction.

Usually, a mPOS application comprises a transaction, e.g. a payment.

During an operation of the mPOS application that has been configured according to the invention, the edge cloud server and the terminal device are both connected to the communication network providing the application backend and the application frontend with a secure connection for communicating with each other.

The application frontend is assigned to and configured for a particular user, e.g. a merchant. For starting a transaction, the user provides the application frontend with transaction data. The transaction data may be automatically provided by an electronic point-of-sale (POS) system connected to the terminal device or manually provided by the user operating a human machine interface of the terminal device, e.g. by hitting a keypad of the terminal device or by touching a keypad displayed by a touch screen of the terminal device. The transaction data to be provided at least comprises a transaction amount, e.g. an amount of money corresponding to a price of a product to be sold.

When the application frontend is provided with the transaction data, the application frontend sends a transaction request to the application backend. The application backend processes the received transaction request and, in response to the transaction request, sends an authorization request to the application frontend. In many embodiments, authorizing the requested transaction comprises reading further transaction data from a transaction device separate from the terminal device and arranged close to the terminal device and adding the read further transaction data to a transaction authorization. The transaction device may be wirelessly read by the terminal device using near field communication (NFC) or Bluetooth. Generally, a further user (e.g. a customer) is required to check the provided transaction data, to provide the further transaction data (e.g. data indicating an account to be debited) and to authorize the transaction. The further user may provide the transaction device comprising the further transaction data (e.g. a payment card or a further terminal device) for being read by the terminal device, and additionally provide a personal key (e.g. a personal identification number (PIN)) by operating the human machine interface of the terminal device (e.g. by hitting a keypad of the terminal device or by touching a keypad displayed by a touch screen of the terminal device).

Thus, in a further embodiment of the invention, when a payment is the transaction to be executed, configuring the application frontend to receive the further transaction data comprises reading account data and authorization data from a credit card or a debit card as the transaction device.

When the provided personal key matches the transaction device the application frontend considers the transaction to be authorized and transmits the transaction authorization comprising the further transaction data to the application backend which processes the further transaction data and completes the transaction.

In many embodiments, completing the transaction comprises transmitting a transaction confirmation to the application frontend.

The transaction confirmation indicates a success of the transaction or an error preventing a success of the transaction. The transaction confirmation may be transmitted to the terminal device via a messaging service of the communication network, e.g. short message service (SMS).

As mentioned above, authorizing the requested transaction comprises reading account data as the further transaction data and authorization data from a credit card or a debit card as the transaction device and a payment is completed as the transaction. Credit cards and debit cards are used by a plurality of further users and, hence, are particularly important transaction devices to be supported for improving an acceptance of the mPOS application.

According to the invention, an edge cloud server located close to the terminal device executes the application backend. The edge cloud server is arranged in a vicinity (i.e. in a spatial vicinity and/or in a logical vicinity) of the terminal device and, hence, allows for a particularly low round trip time (RTT) in completing the transaction which further increases the acceptance of the mPOS application.

Still preferably, the mPOS application is operated using a cellular network as the communication network and the edge cloud server is located close to a radio cell of the cellular network the terminal device is arranged in. The cellular network allows for carrying out the method practically at any place and, hence, strongly improves an applicability of the mPOS application.

The application backend completes the transaction upon receipt of both the transaction request and the transaction authorization. While the transaction request comprises transaction data required for completing the transaction (e.g. an amount of money corresponding to a price of a product or account data), the transaction authorization is caused by a personal key (e.g. a personal identification number (PIN)), which is correctly provided by a further user (e.g. a customer buying the product from the merchant).

In still further embodiments of the invention, splitting the I/O drivers comprised by the computer program code of the mPOS application comprises providing the low-level driver executed on the terminal device with a public private key pair as a first public private key pair for establishing the secure connection. The first public private key pair comprises a first public key and a first private key. The first public private key pair may be pre-personalized, particularly for the user of the terminal device.

The first public key of the first public private key pair is protected by a certificate signed by a trusted authority. The trusted authority may issue and sign the certificate. The user (e.g. the merchant) may register with the trusted authority to use the mPOS application and/or to get the certificate signed by the trusted authority.

In further embodiments of the invention, the method comprises, for establishing the secure connection, sending the certificate from the application frontend to the application backend, particularly from the low-level driver to the high-level driver, and, upon verification of the certificate by the high-level driver, generating a second public private key pair with a second public key and a second private key and sending the second public key of the second public private key pair from the application backend to the application frontend, particularly from the low-level driver to the high-level driver.

For establishing the secure connection, the method further comprises generating, at both the application frontend and the application backend, a common symmetric encryption key based on the first and second public private key pairs. To negotiate the common symmetric encryption key a suitable asymmetric key exchange procedure (i.e. a suitable asymmetric key exchange protocol) is used to transmit the first public key from the low-level driver to the high-level driver and the second public key from the high-level driver to the low-level driver. Known traditional public-key cryptosystems (i.e. algorithms) of securely exchanging encryption keys are Diffie-Hellman key exchange (DH), (better: Diffie-Hellman-Merkle key exchange (DHM)), Diffie Hellman Elliptic Curve (DHEC) and RSA (Rivest-Shamir-Adleman). DH, DHEC and RSA are based on number theoretic methods. Both the application frontend (particularly the first driver) and the application backend (particularly the second driver) use a combination of the public and private keys to negotiate the common symmetric encryption key that is finally used by both the first driver at the terminal device and the second driver at the edge cloud server to communicate with each other. Thus, by using the negotiated common symmetric encryption key, an encrypted tunnel is established as the secure connection between the application frontend and the application backend, particularly between the first driver and the second driver for data exchange.

In further embodiments of the invention, splitting the I/O drivers comprised by the computer program code of the mPOS application comprises configuring the low-level driver executed on the terminal device to identify a NFC tag. Thus, the low-level driver is configured to wirelessly read the transaction device, such as a credit card or a debit card using near field communication (NFC) and to receive further transaction data from the transaction device. The further transaction data may comprise account data of a customer, and/or a personal key of the customer.

Splitting the I/O drivers comprised by the computer program code of the mPOS application may further comprise configuring the low-level driver executed on the terminal device to identify an application ID and/or a user ID, such as a personal key (e.g. a personal identification number (PIN)) provided by a user by operating the human machine interface of the terminal device (e.g. by hitting a keypad of the terminal device or by touching a keypad displayed by a touch screen of the terminal device). Further the low-level driver is configured to process a radio protocol for communicating with the further device and the application backend, particularly the high-level driver, and to encrypt, via the common symmetric encryption key, data, thus providing a transport security when transmitting those data to the application backend. The low-level driver is also capable for bit correcting when receiving and/or transmitting data.

In further embodiments of the invention, splitting the I/O drivers comprised by the computer program code of the mPOS application comprises configuring the high-level driver executed on the edge cloud server to provide data processing, particularly data processing of the transaction data and of the further transaction data read from the transaction device, such as a smart card (e.g. a credit card or a debit card). Therefore, the high-level driver is configured to act as smart card reader using an application protocol data unit (APDU) as communication unit with the smart card. The high-level driver is further configured to decrypt data received from the low-level driver, particularly via the common encryption key. The transaction data, particularly the payment data for the payment transaction, particularly a PAN and, if necessary, a PIN are requested and received via the application frontend, particularly by the low-level driver and securely transmitted from the application frontend via the secure connection to the application backend, particularly to the high-level driver. All transaction data, particularly all payment data is securely processed by the high-level driver. Payment data is mainly the PAN (Primary Account Number of the merchant's customer) and the PIN if a certain transaction value is exceeded.

Further, the mPOS application is configured to operate using a cellular network as the communication network and the edge cloud server is located close to a radio cell of the cellular network the terminal device is arranged in.

By identifying a user ID, as mentioned above, the low-level driver of the application frontend is configured to authenticate a user of the terminal device.

Another aspect of the invention is a system for operating a mPOS application, comprising a mPOS application, a terminal device, an edge cloud server, and a communication network for connecting the terminal device and the edge cloud server via a connection. Due to the mPOS application being configured according to the invention, the involved devices together are configured to operate the mPOS application safely, i.e. protect sensitive data. As the system comprises an edge cloud server and a terminal device (e.g. a smartphone or the like) and a mPOS application (e.g. implemented as a software computer program code) distributed among the edge cloud server and the terminal device, there is a plurality of possible applications of the invention.

In many embodiments of the system, the communication network is a cellular network and the edge cloud server is located close to a radio cell of the cellular network the terminal device is arranged in.

It is an advantage of the invention that the mPOS application is distributed among the terminal device and the edge cloud server in such a way that the application frontend is configured to merely act as I/O interface and that I/O drivers of the mPOS applications are split so that a low-level driver as a first driver is executed as part of the application frontend at the terminal device and a high-level driver as a second driver is executed as part of the application backend in the edge cloud server and the high-level driver is configured to execute all sensitive parts/steps of the software computer program code of the mPOS application, i.e. to realize all steps of the mPOS application that are sensitive and worthy of protection.

Further advantages and configurations of the invention become apparent from the following description and the enclosed drawing.

It shall be understood that the features described previously and to be described subsequently may be used not only in the indicated combinations but also in different combinations or on their own without leaving the scope of the present invention.

The invention is described in detail via an exemplary embodiment and with reference to the drawing. Like components are indicated by like reference numerals throughout the drawing.

FIG. 1 schematically shows a diagram of a system 1 according to the invention for operating a mPOS application 14. The system 1 comprises the mPOS application 14, a terminal device 11, an application frontend 141 of the mPOS application 14 to be executed by the terminal device 11, and an edge cloud server 10, an application backend 140 to be executed by the edge cloud server 10 and a communication network 13 for connecting the terminal device 11 and the edge cloud server 10.

The edge cloud server 10 connected to the communication network 13 executes the application backend 140 of the mPOS application 14. The edge cloud server is located close to the terminal device 11. When the mPOS application 14 is operated using a cellular network as the communication network 13, the edge cloud server 10 may be located close to a radio cell 130 of the cellular network the terminal device 11 is arranged in.

The terminal device 11 connected to the communication network 13 via a secure connection 131 executes the application frontend 141 of the mPOS application 14.

The application frontend 141 is configured to act, upon launch, as an I/O interface and to communicate with the application backend 140 via the secure connection 131 provided by the communication network 13. I/O drivers comprised by the computer program code of the mPOS application 14 are split into a low-level driver 1410 executed on the terminal device 11 as part of the I/O interface and a high-level driver 1401 executed in the application backend 140 at the edge cloud server 10.

During operation of the mPOS application 14, the application frontend 141 may first authenticate via the low-level driver 1410 a user 8 (e.g. a merchant) of the terminal device 11. For authenticating the user 8 the low-level driver 1410 is configured to identify an application ID and/or a user ID, such as a personal key (e.g. a personal identification number (PIN)) provided by the user by operating the terminal device 11 (e.g. by operating a human machine interface of the terminal device 11 (e.g. by hitting a keypad of the terminal device 11 or by touching a keypad displayed by a touch screen of the terminal device 11)). For starting a transaction associated with operating the mPOS application 14, the application frontend 141 then transmits a transaction request indicating the transaction to be started and comprising transaction data (e.g. an amount of money corresponding to a price of a product) associated with the indicated transaction to the application backend 140 via the connection 131. The low-level driver 1410 is configured to process a radio protocol and to encrypt, via an encryption key 1411, data (e.g. the transaction data), thus providing a transport security when transmitting the transaction request. The low-level driver 1410 is also capable for bit correcting when receiving and transmitting data, particularly transaction data.

Further, the application frontend 141, upon receipt of an authorization request from the application backend 140, authorizes the requested transaction (e.g. by requiring via the low-level driver 1410 a personal key like a personal identification number (PIN) of a further user 9 (e.g. a merchant's customer)), and transmits a transaction authorization to the application backend 140 via the connection 131. Authorizing the requested transaction may further comprise reading further transaction data from a transaction device 6 (e.g. a credit card or a debit card of the further user 9), separate from the terminal device 11 and arranged close to the terminal device 11 and adding the read further transaction data to the transaction authorization. The transaction device 6 is provided by the further user 9. For reading the transaction device 6, the low-level driver 1410 is configured to identity a NFC tag. Thus, the low-level driver 1410 is configured to wirelessly read the transaction device 6 via a CLF (contactless frontend) chip using near field communication (NFC) and to receive the further transaction data from the transaction device 6. The further transaction data may comprise account data of the further user 9, and/or a personal key of the further user 9.

The application backend 140, upon receipt of the transaction authorization, completes the transaction. Completing the transaction comprises transmitting a transaction confirmation to the application frontend 141. When a credit card or a debit card is used as the transaction device 6, a payment is completed as the transaction. The application backend 140 provides the high-level driver 1401 which is configured to receive the transaction request comprising the transaction data which have been entered by the user 8 via the human machine interface, such as a touch display, of the terminal device 11. The application backend 140 further provides a payment kernel 1402 which is configured to receive the further transaction data, previously wirelessly read by the terminal device 11, particularly the low-level driver 1410, from the transaction device 6 using near field communication (NFC) or Bluetooth. The payment kernel 1402 is logically connected with the high-level driver 1401 and further provides a secure interface, particularly a client unit configured to communicate with a transaction host, particularly a payment host 1501 of a transaction system, particularly a payment system 150 of a respective customer, the transaction/payment system 150 being located in a remote transaction infrastructure.

Splitting the I/O drivers comprised by the computer program code of the mPOS application 14 comprises providing the low-level driver 1410 executed on the terminal device 11 with a pre-personalized public private key pair as a first public private key pair for establishing the secure connection 131. The first public private key pair comprises a first public key and a first private key.

The first public key of the first public private key pair is protected by a certificate signed by a trusted authority. The trusted authority may issue and sign the certificate. The user 8 (e.g. the merchant) may register with the trusted authority to use the mPOS application 14 and/or to get the certificate signed by the trusted authority.

For establishing the secure connection 131, the certificate is sent from the application frontend 141 to the application backend 140, particularly from the low-level driver 1410 to the high-level driver 1401, and, upon verification of the certificate by the high-level driver 1401, a second public private key pair with a second public key and a second private key is generated. The second public key of the second public private key pair is sent from the application backend 140 to the application frontend 141, particularly from the high-level driver 1401 to the low-level driver 1410. At both the application frontend 141 and the application backend 140, the common symmetric encryption key 1411 based on the first and second public private key pairs is created. To negotiate the common symmetric encryption key 1411 a suitable asymmetric key exchange procedure (i.e. a suitable asymmetric key exchange protocol) is used. Known traditional public-key cryptosystems (i.e. algorithms) of securely exchanging encryption keys are Diffie-Hellman key exchange (DH), (better: Diffie-Hellman-Merkle key exchange (DHM)), Diffie Hellman Elliptic Curve (DHEC) and RSA (Rivest-Shamir-Adleman). DH, DHEC and RSA are based on number theoretic methods. Both the application frontend 141 (particularly the first driver 1410) and the application backend 140 (particularly the second driver 1401) use a combination of the public and private keys to negotiate the common symmetric encryption key 1411 that is finally used by both the first driver 1410 at the terminal device 11 and the second driver 1401 at the edge cloud server 10 to communicate with each other. Thus, using the negotiated common symmetric encryption key 1411, an encrypted tunnel as the secure connection 131 is established between the application frontend 141 and the application backend 140, particularly between the first driver 1410 and the second driver 1401 for data exchange.

Splitting the I/O drivers comprised by the computer program code of the mPOS application 14 comprises configuring the high-level driver (i.e. the second driver 1401 executed on the edge cloud server 10) to provide APDU (application protocol data unit) data processing, to decrypt data received from the low-level driver 1410 and/or to provide application protocol handling, particularly transaction data processing. The transaction data, particularly the payment data for the payment transaction, particularly a PAN (Primary Account Number of the merchant's customer) and, if necessary, a PIN, if a certain transaction value is exceeded, are requested and received via the application frontend 141, particularly by the low-level driver 1410 executed at the terminal device 11 and securely transmitted from the application frontend 141 via the secure connection 131 to the application backend 140, particularly to the high-level driver 1401 executed in the edge cloud server 10.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

1 system
10 edge cloud server
11 terminal device
13 communication network
130 radio cell
131 connection
14 mPOS application
140 application backend
1401 high-level driver
1402 payment kernel
141 application frontend
1410 low-level driver
1411 encryption key
150 transaction system
1501 transaction host
6 transaction device
8 user
9 further user

The invention claimed is:
1. A method for configuring a mobile Point-of-Sales (mPOS) application for executing a transaction, wherein the mPOS application is implemented as a computer program code, the method comprising:
  installing an application frontend of the mPOS application on a terminal device connected to a communication network;
  installing an application backend of the mPOS application on an edge cloud server of the communication network;

configuring the application frontend to act, upon launch, as an input/output (I/O) interface and to communicate with the application backend via a secure connection provided by the communication network; and splitting I/O drivers comprised by the computer program code of the mPOS application into a low-level driver executed on the terminal device as part of the I/O interface and a high-level driver executed in the application backend at the edge cloud server;

wherein splitting the I/O drivers comprised by the computer program code of the mPOS application comprises providing the low-level driver executed on the terminal device, for establishing the secure connection, with a public private key pair as a first public private key pair with a first public key and a first private key:

wherein the first public key of the first public private key pair is protected by a certificate signed by a trusted authority; and wherein the method further comprises: for establishing the secure connection, sending the certificate from the application frontend to the application backend and, upon verification of the certificate by the high-level driver, generating a second public private key pair with a second public key and a second private key and sending the second public key of the second public private key pair from the application backend to the application frontend.

2. The method according to claim 1, wherein configuring the application frontend as an I/O interface comprises configuring the application frontend to capture transaction data from a user via a human machine interface of the terminal device and to receive further transaction data from a transaction device via the low-level driver and to transmit the transaction data and the further transaction data via the secure connection to the high-level driver.

3. The method according to claim 2, wherein, when a payment is the transaction to be executed, configuring the application frontend to receive the further transaction data comprises reading account data and authorization data from a credit card or a debit card as the transaction device.

4. The method according to claim 1, further comprising:
for establishing the secure connection, generating, at both the application frontend and the application backend, a common symmetric encryption key based on the first and second public private key pairs using a public-key cryptosystem;

wherein the public-key cryptosystem is one of Diffie-Hellman key exchange (DH), Diffie Hellman Elliptic Curve (DHEC), and Rivest-Shamir-Adleman (RSA).

5. The method according to claim 1, wherein splitting the I/O drivers comprised by the computer program code of the mPOS application comprises configuring the low-level driver executed on the terminal device to identify a near field communication (NFC) tag and/or an application ID and/or a user ID, to process a low level radio protocol, to encrypt low level data and/or to provide a transport security and/or a bit correction.

6. The method according to claim 1, wherein splitting the I/O drivers comprised by the computer program code of the mPOS application comprises configuring the high-level driver executed on the edge cloud server to provide application protocol data unit (APDU) data processing, to decrypt data and/or to provide transaction data processing.

7. The method according to claim 1, wherein the mPOS application is configured to operate using a cellular network as the communication network.

8. The method according to claim 1, wherein the application frontend is configured to authenticate a user of the terminal device.

9. A system for operating a mobile Point-of-Sales (mPOS) application for executing a transaction, wherein the mPOS application is implemented as a computer program code, comprising:
a terminal device configured to install an application frontend of the mPOS application; and an edge cloud server of a communication network connected to the terminal device;

wherein the edge cloud server is configured to install an application backend of the mPOS application;

wherein the application frontend is configured to act, upon launch, as an input/output (I/O) interface and to communicate with the application backend via a secure connection provided by the communication network; and wherein I/O drivers comprised by the computer program code of the mPOS application are configured to be split into a low-level driver executed on the terminal device as part of the I/O interface and a high-level driver executed in the application backend at the edge cloud server;

wherein the I/O drivers comprised by the computer program code of the mPOS application being split comprises providing the low-level driver executed on the terminal device, for establishing the secure connection, with a public private key pair as a first public private key pair with a first public key and a first private key;

wherein the first public key of the first public private key pair is protected by a certificate signed by a trusted authority:

wherein, for establishing the secure connection, the application frontend is configured to send the certificate to the application backend; and wherein the application backend is configured, upon verification of the certificate by the high-level driver, to generate a second public private key pair with a second public key and a second private key and send the second public key of the second public private key pair to the application frontend.

10. The system according to claim 9, wherein the communication network is a cellular network, and wherein the terminal device is arranged in the cellular network.

* * * * *